United States Patent
Shekhar et al.

(10) Patent No.: US 11,586,445 B2
(45) Date of Patent: Feb. 21, 2023

(54) MODULAR GATED MULTIPLIER CIRCUITRY AND MULTIPLICATION TECHNIQUE

(71) Applicant: Arm Limited, Cambridge (GB)

(72) Inventors: Shardendu Shekhar, Austin, TX (US); Andy Wangkun Chen, Austin, TX (US); Anil Kumar Baratam, Bangalore (IN); James Dennis Dodrill, Dripping Springs, TX (US); Yew Keong Chong, Austin, TX (US)

(73) Assignee: Arm Limited, Cambridge (GB)

( * ) Notice: Subject to any disclaimer, the term of this patent is extended or adjusted under 35 U.S.C. 154(b) by 508 days.

(21) Appl. No.: 16/698,862

(22) Filed: Nov. 27, 2019

(65) Prior Publication Data

US 2021/0157603 A1    May 27, 2021

(51) Int. Cl.
| | |
|---|---|
| G06F 9/38 | (2018.01) |
| G06F 7/53 | (2006.01) |
| G06F 7/544 | (2006.01) |
| G06F 9/30 | (2018.01) |
| G06F 12/02 | (2006.01) |

(52) U.S. Cl.
CPC .......... G06F 9/3869 (2013.01); G06F 7/5324 (2013.01); G06F 7/5443 (2013.01); G06F 9/30014 (2013.01); G06F 9/30032 (2013.01); G06F 9/3893 (2013.01); G06F 12/0207 (2013.01)

(58) Field of Classification Search
CPC .. G06F 9/3869; G06F 9/3893; G06F 9/30032; G06F 7/5324; G06F 7/5443
See application file for complete search history.

(56) References Cited

U.S. PATENT DOCUMENTS

| | | | |
|---|---|---|---|
| 7,028,068 B1* | 4/2006 | Goveas | G06F 9/30036 712/E9.071 |
| 8,527,572 B1* | 9/2013 | Young | G06F 7/00 708/620 |
| 8,706,793 B1* | 4/2014 | Young | G06F 5/01 708/620 |
| 9,606,608 B1 | 3/2017 | Langhammer | |
| 2013/0031154 A1* | 1/2013 | Wiencke | G06F 7/5312 708/620 |

OTHER PUBLICATIONS

International Search Report and Written Opinion dated Aug. 5, 2020, International Application No. PCT/GB2020/050741, filed Mar. 19, 2020, (15 pages).

(Continued)

*Primary Examiner* — Michael D. Yaary
(74) *Attorney, Agent, or Firm* — Pramudji Law Group PLLC; Ari Pramudji

(57) ABSTRACT

Various implementations described herein are related to a device having multiplier circuitry with an array of summation result cells that holds summation bit values for shifted arrays added together. The device may include latch circuitry having one or more gated elements disposed between the summation result cells, and the gated elements may be adapted to provide a portion of the summation bit values based on a gating signal.

20 Claims, 7 Drawing Sheets

(56) References Cited

OTHER PUBLICATIONS

Ayman A. Fayed et al., "A Novel Architecture for Low-Power Design of Parallel Multipliers", The Center for Advanced Computer Studies, IEEE Computer Society Workshop, Apr. 19-20, 2001, pp. 149-154, (6 pages).
Jia Di et al., "Power-aware Pipelined Multiplier Design Based on 2-Dimensional Pipeline Gating", School of Electrical Engineering and Computer Science, University of Central Florida, Apr. 2003, pp. 64-67, (4 pages).
M. B. Damle et al., "Low-power Full Adder Array-Based Multiplier with Domino Logic", IOSR Journal of Electronics and Communication Engineering (IOSREJECE), ISSN: 2278-2834, vol. 1, Issue 1, May-Jun. 2012, pp. 18-22, (5 pages).
Choi, et al.; Power Minimization of Functional Units by Partially Guarded Computation; ISLPED '00; Jul. 2000.

* cited by examiner

MODULAR GATED MULTIPLIER CIRCUITRY AND MULTIPLICATION TECHNIQUE

BACKGROUND

This section is intended to provide information relevant to understanding the various technologies described herein. As the section's title implies, this is a discussion of related art that should in no way imply that it is prior art. Generally, related art may or may not be considered prior art. It should therefore be understood that any statement in this section should be read in this light, and not as any admission of prior art.

In conventional systems, multipliers are typically designed to handle the largest number that needs to be handled by the application, which may cause a large part of the multiplier processing to glitch when handling smaller numbers. These types of multipliers are used in machine learning applications, and these types of multiplier designs typically implement 8-bit logic that is built to handle numbers within a range of 0 to 255 and also numbers within a range of −255 to 0. Also, other multiplier designs may use 9-bit signed logic that is built to handle numbers within a range of −255 to 255. However, these types of multipliers typically exhibit glitching problems due to complicated and inefficient layout designs. As such, there exists a need to improve physical design implementation of some multiplier circuitry so as to provide for more efficient binary multiplication operations.

BRIEF DESCRIPTION OF THE DRAWINGS

Implementations of various techniques are described herein with reference to the accompanying drawings. It should be understood, however, that the accompanying drawings illustrate only various implementations described herein and are not meant to limit embodiments of various techniques described herein.

DETAILED DESCRIPTION

Figure 1:
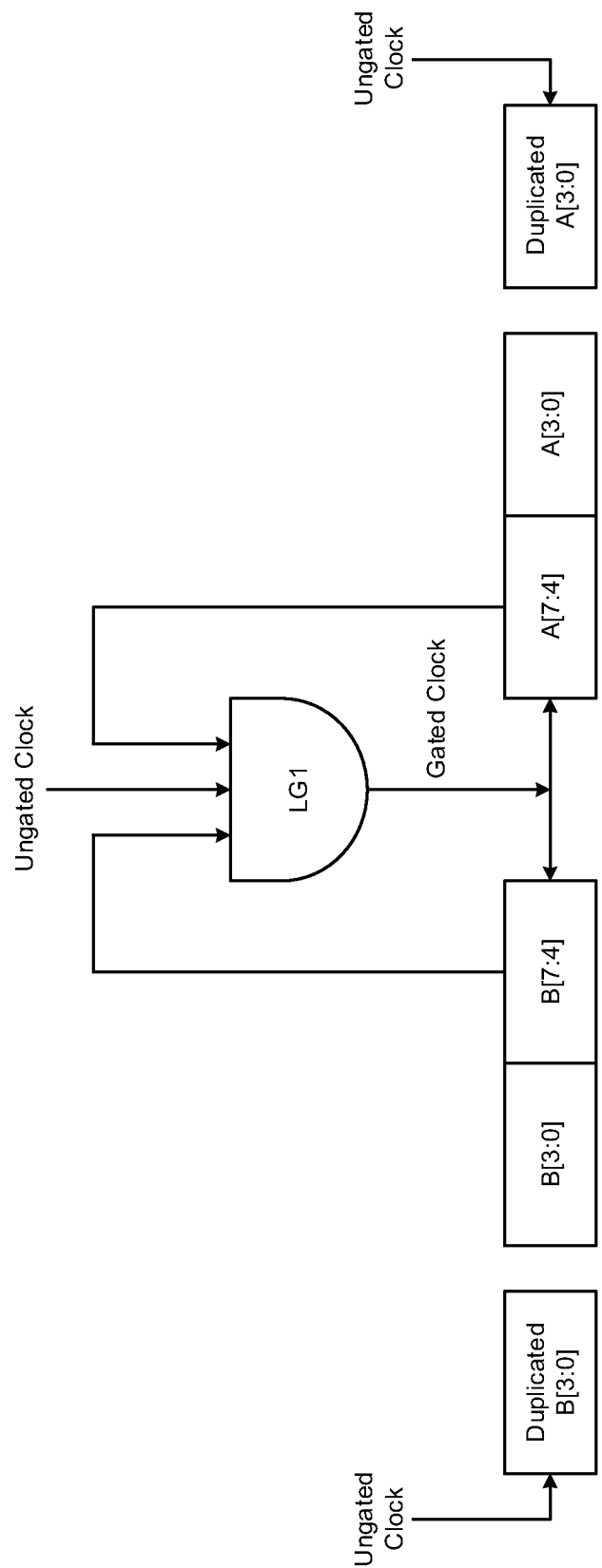
FIG. 1 illustrates multiplier circuitry having modular low power gated logic in accordance with various implementations described herein.

Various implementations described herein are related to binary multiplication schemes and techniques that improve power management in physical layout design of multiplier architecture. For instance, various schemes and techniques described herein provide for a system or a device having a modular low power gated multiplier. In some instances, aspects of the present disclosure provide for a modular multiplier structure that may be used to build larger multipliers with gated elements to save power. In reference to some machine learning applications, the modular multiplier may frequently handle only small numbers. Some schemes and techniques described herein utilize an 8×8 bit integer multiplier that is constructed with multiple 4×4 multipliers and gating elements. Use of the binary multiplication schemes and techniques provided herein result in operational power saving when a majority of input values are less than 15, e.g., when the most significant 4 bits of each input are zero. The schemes and techniques described herein may be used to construct a low power multiplier of any size with gated elements and smaller modular multipliers of suitable size. In various implementations, the gating elements and the size of the smaller modular multipliers may be utilized as building blocks for building larger multipliers depending on distribution of input vector magnitudes.

Various binary multiplication schemes and techniques described herein refer to a modular low power gated multiplier that utilizes various types of logic circuitry, including, e.g., product logic, summation logic, and/or latching logic. The product logic may be used to generate product bit values. The summation logic may be coupled to the product logic, and the summation logic may be used to generate summation bit values by shifting and adding the product bit values. The latching logic may be coupled to the summation logic, and the latching logic may be configured to output a portion of the summation bit values based on a gating signal. The product logic may be configured to operate as a partial product generator that receives multiplicand bits, receives multiplier bits, and provides the product bit values based on the multiplicand bits and the multiplier bits. The product logic may include an array of product cells that holds the product bit values, and the array of product cells may be arranged in columns and rows, and cells in each row may be shifted by at least one column with respect to cells in a previous row.

In some implementations, the summation logic may be configured to operate as a partial product compressor that uses full adders and half adders to perform shifting operations and adding operations associated with the product bit values. The summation logic may include an array of summation result cells that holds the summation bit values, and the array of summation cells may be arranged in columns and rows, and cells in each row are shifted by at least one column with respect to cells in a previous row. The latching logic may include latches that operate as gated elements, and the gating signal may be used to turn an output of the latches opaque or transparent. The latches may include a first set of latches and a second set of latches. The first set of latches may be configured to operate as transparent latches that receive the gating signal and toggle to provide the portion of the summation bit values as a toggling output based on the gating signal. Also, the second set of latches may be configured to operate as opaque latches that receive the gating signal and provide an output that remains unchanged so as to not provide a toggling output based on the gating signal.

Various implementations of binary multiplication schemes and techniques will be described in detail herein with reference to FIGS. 1-5.

FIG. 1 illustrates multiplier circuitry 100 having modular low power gated logic in accordance with various implementations described herein.

In various implementations, the multiplier circuitry 100 may be implemented as a system or a device having various integrated circuit (IC) components that are arranged and coupled together as an assemblage or combination of parts that provide for a physical circuit design and related structures. In some instances, a method of designing, providing and building the multiplier circuitry 100 as an integrated system or device may involve use of the various IC circuit components described herein so as to thereby implement binary multiplication schemes and techniques associated therewith. The multiplier circuitry 100 may be integrated with computing circuitry and related components on a single chip, and the multiplier circuitry 100 may be implemented in various embedded systems for various electronic, mobile and Internet-of-things (IoT) applications, including sensor nodes.

As shown in FIG. 1, the multiplier circuitry 100 may include multiplier building blocks, such as, e.g., N×N multiplier building blocks, wherein N may be 8. As such, the N×N multiplier building blocks may refer to 8×8 multiplier building blocks. In this instance, the multiplier circuitry 100 may include input registers that are configured to hold an input steady for computation in a cycle, and for an 8×8 multiplier, there may be two 8-bit input registers, such as, e.g., a multiplicand A[7:0] and a multiplier B[7:0]. Thus, the multiplier circuitry 100 may use a value of A[7:4] and B[7:4] to generate a gating signal, such as, e.g., a gated clock signal. In some instances, if a value of the multiplicand A[7:4] is 0000, and a value of multiplier B[7:4] is 00000, then the gating signal is 1.

The multiplier circuitry 100 may include one or more logic gates, such as, e.g., a first logic gate LG1 (e.g., AND gate), that receives an ungated clock, receives the value for B[7:4], receives the value for A[7:4], and provides the gated clock signal. The 8-bit multiplicand A[7:0] has a first 4-bit part A[3:0] and a second 4-bit part A[7:4], and the 8-bit multiplier B[7:0] has a first 4-bit part B[3:0] and a second 4-bit part B[7:4]. Also, the first 4-bit part A[3:0] of the multiplicand A[7:0] may be duplicated and supplied with the ungated clock for operations, and the other first 4-bit part B[3:0] of the multiplier B[7:0] may also be duplicated and supplied with the ungated clock for operations.

In reference to FIG. 1, aspects of the present disclosure provide for various binary multiplication schemes and techniques where activity is reduced in unused portions of the multiplier by gating the input registers and splitting the multiplier into smaller blocks depending on the input values. For instance, a portion of the input registers may need to be duplicated to ensure correct functionality, and this scheme may be used to simplify the logic behind insertion of the gating elements by breaking the multiplier layout design into smaller multipliers. The smaller multiplier may work independently, and results of smaller multipliers may be added in the end to achieve final results. The independent operation of smaller multipliers along with the gating elements may reduce unwanted glitching from sections of the multipliers that may not contribute to the final results. In this instance, in reference to FIG. 1, an 8×8 multiplier may be implemented using four 4×4 multipliers, and when the input weight and feature are only 4-bit numbers (i.e., less than 15), the input to three out of the four 4×4 multipliers may be gated, thus reducing activity in that section of the multiplier to zero. Also, the latch between the partial product trees may ensure that no activity is propagated, while ensuring that the output remains correct.

Figure 2:
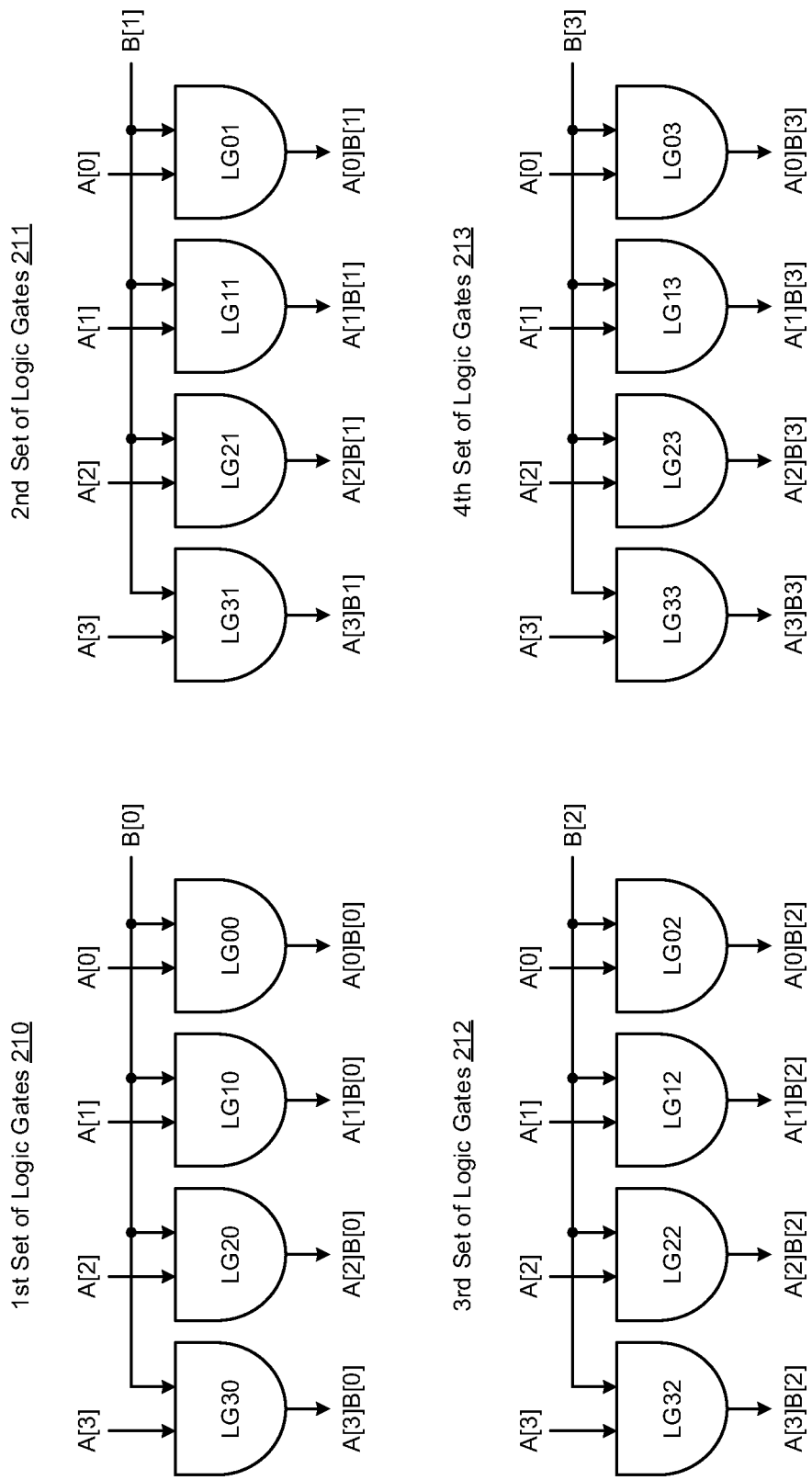
FIG. 2 illustrates partial product generation circuitry in accordance with various implementations described herein.

FIG. 2 illustrates partial product generation circuitry 200 in accordance with various implementations described herein.

In various implementations, the partial product generation circuitry 200 may be implemented as a system or device having various integrated circuit (IC) components that are arranged and coupled together as an assemblage or combination of parts that provide for a physical circuit layout design and related structures. In some instances, a method of designing, providing and/or building the partial product generation circuitry 200 as an integrated system or related device may involve use of the various IC circuit components described herein so as to thereby implement various binary multiplication schemes and techniques associated therewith. Also, the partial product generation circuitry 200 may be integrated with computing circuitry and related components on a single chip, and the partial product generation circuitry 200 may be implemented in embedded systems for various electronic, mobile and Internet-of-things (IoT) applications.

As shown in FIG. 2, the partial product generation circuitry 200 may be used and configured for partial product generation, wherein single-bit values of the multiplicand A[7:0] and the multiplier B[7:0] may be logically combined to generate a partial product of the single-bit components. For instance, two input AND gates may be used to receive the single-bit values from the 8-bit multiplicand A[7:0] and the 8-bit multiplier B[7:0], wherein each logic gate (e.g., AND gate) accepts one bit from the multiplicand A[7:0] and another bit from the multiplier B[7:0], and each logic gate preforms an AND function to generate a partial product bit. In this instance, for an 8×8 multiplier, there may be 64 partial products, and for a 4×4 multiplier, there may be 16 partial products. Thus, an 8×8 multiplier may be used to implement four 4×4 multipliers, wherein the partial product generation circuitry 200 in FIG. 2 may refer to an 8-bit partial product generator as a 4×4 multiplier. Also, in this instance, the 4×4 multiplier may be used as a building block for the 8×8 multiplier, and with the 4×4 multiplier being discussed at gate level, construction of the 8×8 multiplier may be achieved with multiple 4×4 multiplier building blocks.

In FIG. 2, the partial product generation circuitry 200 may have a first set 210 of logic gates (LG00, LG10, LG20, LG30) arranged to receive single-bit values (A[0], A[1], A[2], A[3]) of the first 4-bit part A[3:0] of the 8-bit multiplicand A[7:0] along with the first single-bit value (B[0]) of the first 4-bit part B[3:0] of the 8-bit multiplier B[7:0] and generate a first set of partial product values (A[0]B[0], A[1]B[0], A[2]B[0], A[3]B[0]).

The partial product generation circuitry 200 may have a second set 211 of logic gates (LG01, LG11, LG21, LG31) arranged to receive the single-bit values (A[0], A[1], A[2], A[3]) of the first 4-bit part A[3:0] of the 8-bit multiplicand A[7:0] along with the second single-bit value (B[1]) of the first 4-bit part B[3:0] of the 8-bit multiplier B[7:0] and generate a second set of partial product values (A[0]B[1], A[1]B[1], A[2]B[1], A[3]B[1]).

The partial product generation circuitry 200 may have a third set 212 of logic gates (LG02, LG12, LG22, LG32) arranged to receive the single-bit values (A[0], A[1], A[2], A[3]) of the first 4-bit part A[3:0] of the 8-bit multiplicand A[7:0] along with the third single-bit value (B[2]) of the first 4-bit part B[3:0] of the 8-bit multiplier B[7:0] and generate a third set of partial product values (A[0]B[2], A[1]B[2], A[2]B[2], A[3]B[2]).

The partial product generation circuitry 200 may have a fourth set 213 of logic gates (LG03, LG13, LG23, LG33) arranged to receive the single-bit values (A[0], A[1], A[2], A[3]) of the first 4-bit part A[3:0] of the 8-bit multiplicand A[7:0] along with the fourth single-bit value (B[3]) of the first 4-bit part B[3:0] of the 8-bit multiplier B[7:0] and generate a fourth set of partial product values (A[0]B[3], A[1]B[3], A[2]B[3], A[3]B[3]).

Figure 3:
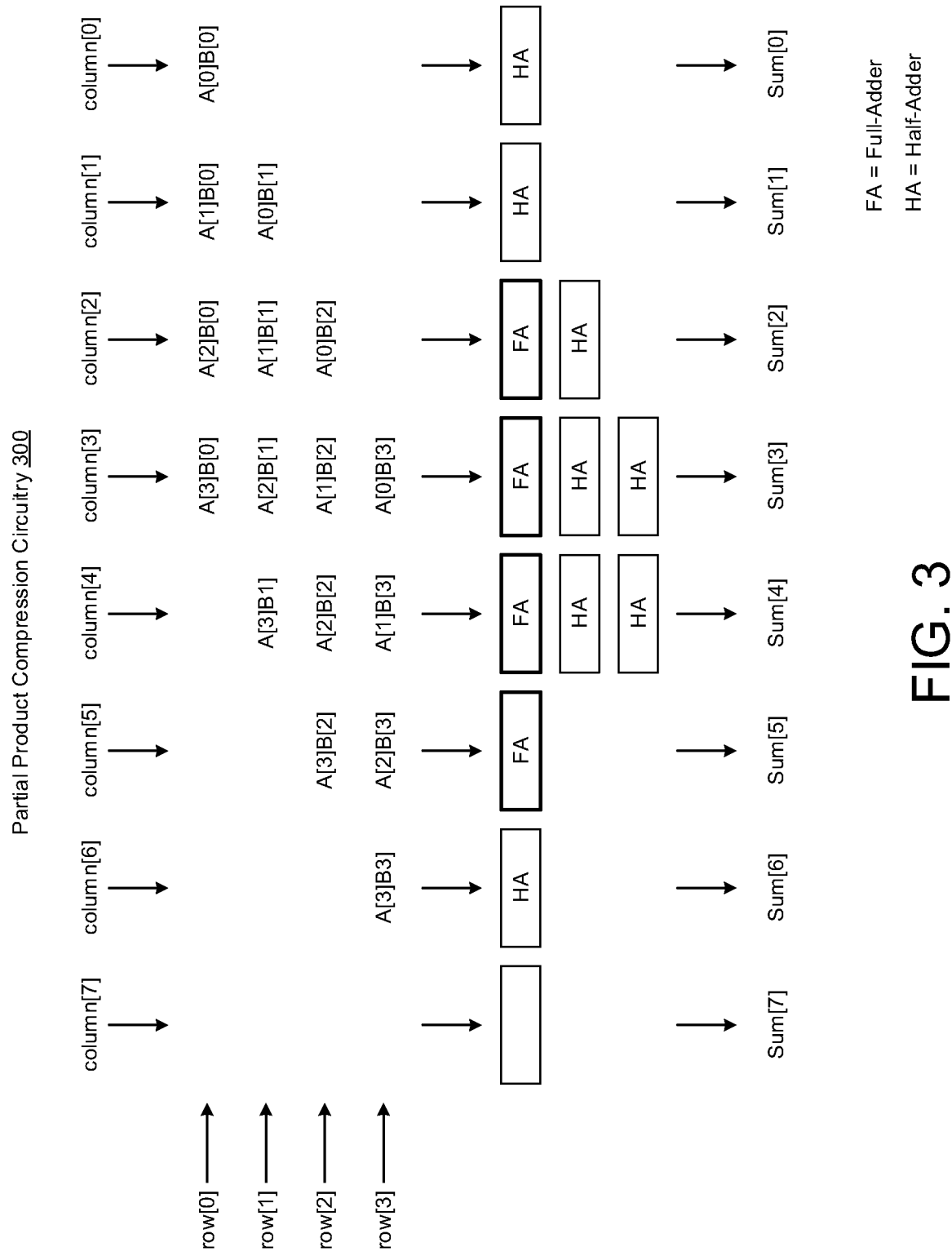
FIG. 3 illustrates partial product compression circuitry in accordance with various implementations described herein.

FIG. 3 illustrates partial product compression circuitry 300 in accordance with various implementations described herein.

In various implementations, the partial product compression circuitry 300 may be implemented as a system or a device having various integrated circuit (IC) components that are arranged and coupled together as an assemblage or some combination of parts that provide for a physical circuit layout design and related structures. In some instances, a method of designing, providing or building the partial product compression circuitry 300 as an integrated system or device may involve use of the various IC circuit components described herein so as to thereby implement various binary multiplication schemes and techniques associated therewith. Also, the partial product compression circuitry 300 may be integrated with computing circuitry and related components on a single chip, and the partial product compression circuitry 300 may be implemented in embedded systems for various electronic, mobile and Internet-of-things (IoT) applications.

As shown in FIG. 3, the partial product compression circuitry 300 may be used and configured for partial product compression, which may refer to partial product summation. For instance, each row (row[0], row[1], row[2], row[3]) of the partial product may correspond to each multiplicand bit (e.g., A[7:0]) multiplied by each multiplier bit (e.g., B[7:0]). In this instance, each multiplicand bit may refer to the first 4-bit part A[3:0] of the 8-bit multiplicand A[7:0], and also, each multiplier bit may refer to the first 4-bit part B[3:0] of the 8-bit multiplier B[7:0]. So as to achieve a final combinational result, a shift and add operation may be performed on one or more or all partial product rows (row[0], row[1], row[2], row[3]), as shown in FIG. 3. In this instance, the partial product compression circuitry 300 may be used and configured to perform a shift and add operation on the partial products for the 4×4 multiplier of FIG. 2. Also, the partial product compression circuitry 300 may be include use of one or more full-adders (FA), one or more half-adders (HA), and/or some higher order compressor may be used to add partial products.

In FIG. 3, the partial product compression circuitry 300 may include multiple rows, including e.g., a first row (row[0]), a second row (row[1]), a third row (row[2]), and a fourth row (row[3]), wherein each row (row[0], row[1], row[2], row[3]) may include one or more partial products. For instance, the first row (row[0]) may have one or more partial products, including, e.g., one or more partial products of the first set of partial product values (A[0]B[0], A[1]B[0], A[2]B[0], A[3]B[0]). The second row (row[1]) may have one or more partial products, including, e.g., one or more partial products of the second set of partial product values (A[0]B[1], A[1]B[1], A[2]B[1], A[3]B[1]). The third row (row[2]) may have one or more partial products, including, e.g., one or more partial products of the third set of partial product values (A[0]B[2], A[1]B[2], A[2]B[2], A[3]B[2]). The fourth row (row[3]) may have one or more partial products, including, e.g., one or more partial products of the fourth set of partial product values (A[0]B[3], A[1]B[3], A[2]B[3], A[3]B[3]).

In some implementations, the partial product compression circuitry 300 may be used and configured to provide summation results (e.g., Sum[0], Sum[1], . . . , Sum[7], for N=8 bit) in reference to each vertical column in the row-shifted stack. For instance, in the first column col[0], a half-adder (HA) may be configured to generate the first summation result for Sum[0], which refers to A[0]B[0]+0, and also, in the second column col[1], a half-adder (HA) may be configured to generate the second summation result for Sum[1], which refers to A[1]B[0]+A[0]B[1].

Also, in the third column col[2], a full-adder (FA) and a half-adder (HA) may be configured to generate the third summation result for Sum[2], which refers to A[2]B[0]+A[1]B[1]+A[0]B[2], and also, in the fourth column col[3], a full-adder (FA) and multiple half-adders (e.g., 2 HAs) may be configured to generate the fourth summation result for Sum[3], which refers to A[3]B[0]+A[2]B[1]+A[1]B[2]+A[0]B[3].

In the fifth column col[4], a full-adder (FA) and multiple half-adders (e.g., 2 HAs) may be configured to generate the fifth summation result for Sum[4], which refers to A[3]B[1]+A[2]B[2]+A[1]B[3], and also, in the sixth column col[5], a full-adder (FA) may be configured to generate the sixth summation result for Sum[5], which refers to A[3]B[2]+A[2]B[3]. In the seventh column col[6], a half-adder (HA) may be configured to generate the seventh summation result for Sum[6], which refers to A[3]B[3]+0, and also, in the eighth column col[7], no adder (FA) may be used to generate a null value (0).

Figure 4A:
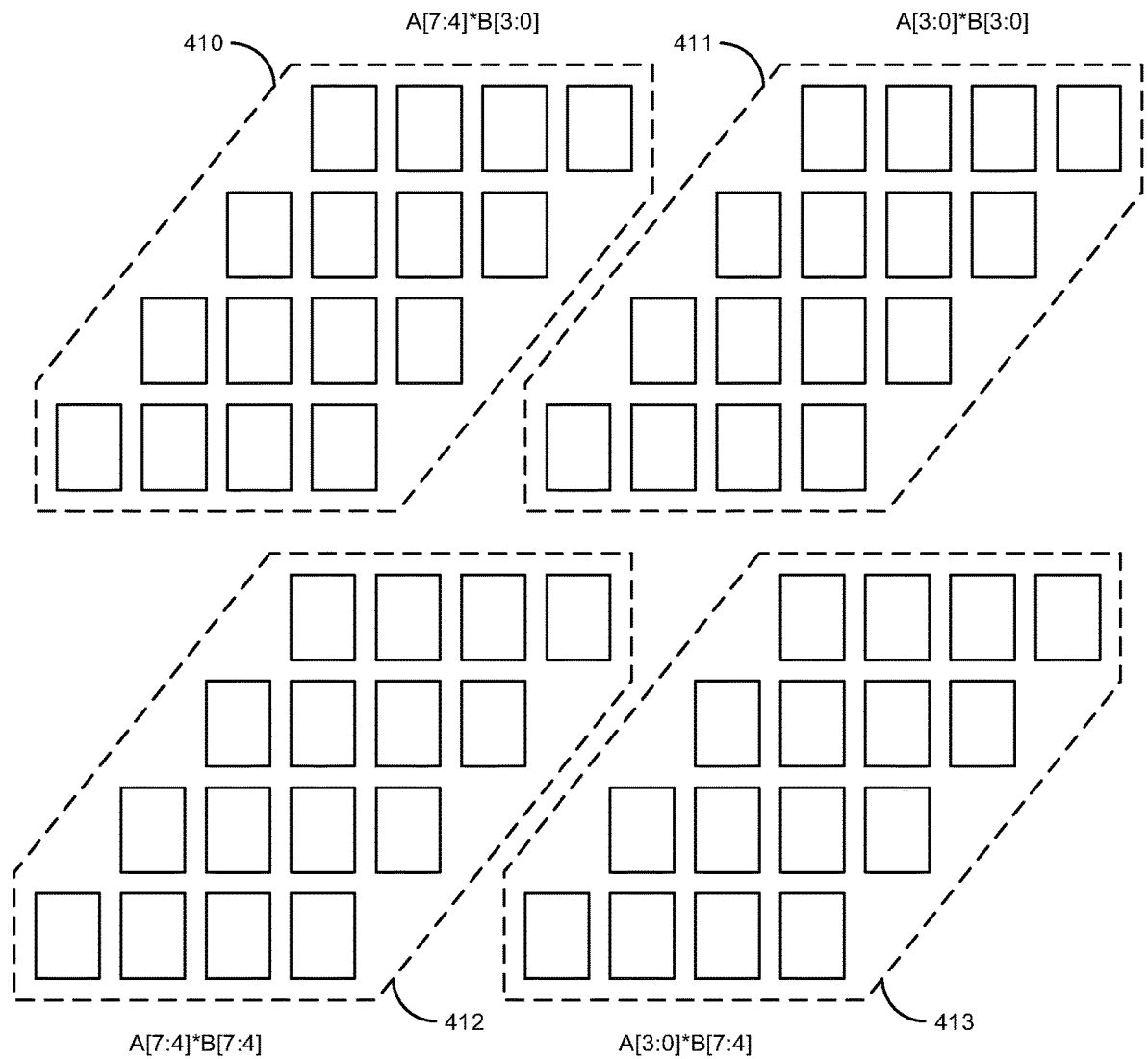
FIGS. 4A-4C illustrate multi-cell structuring of multiplier circuitry in accordance with various implementations described herein.
Figure 4B:
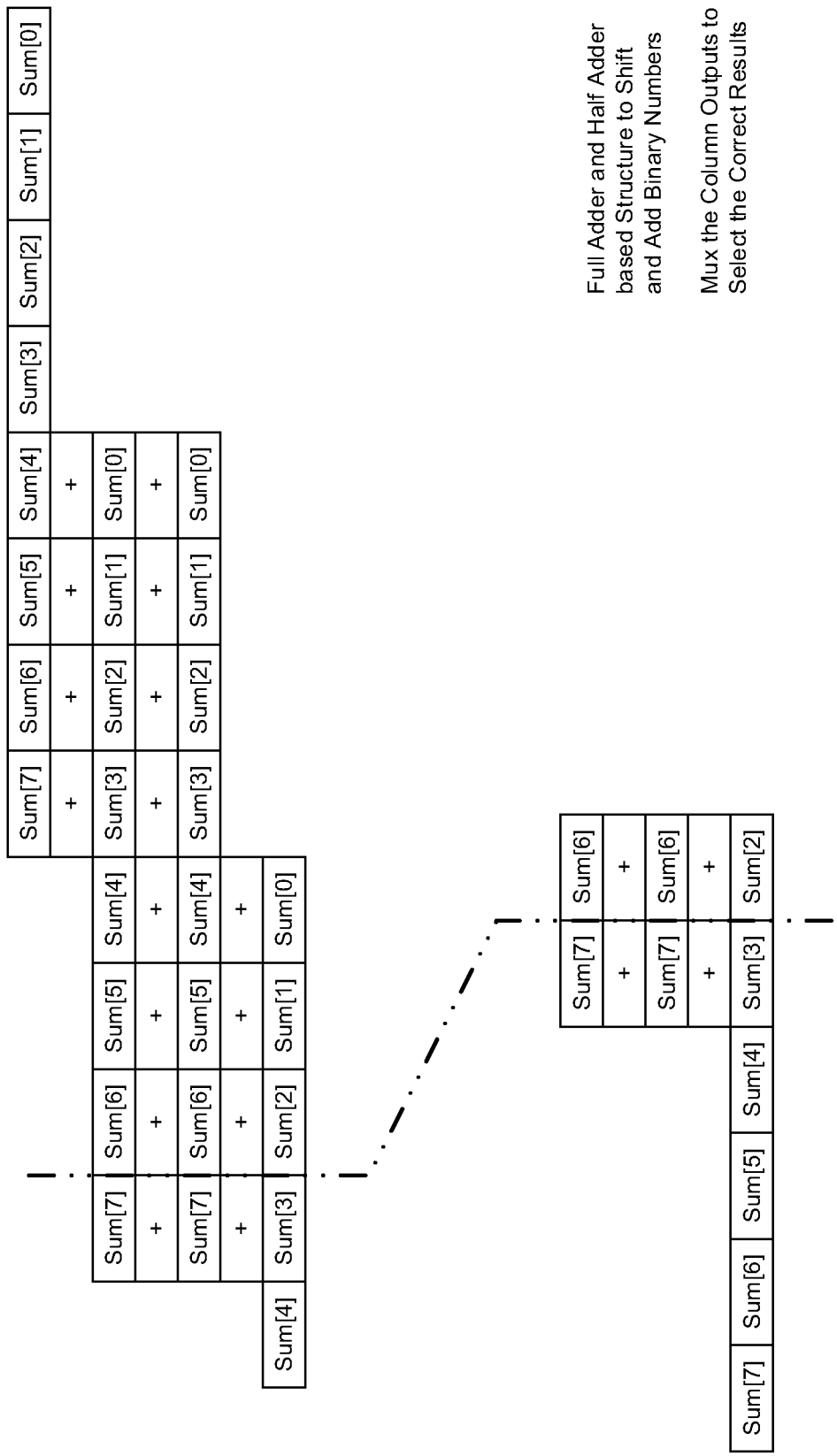
Figure 4C:
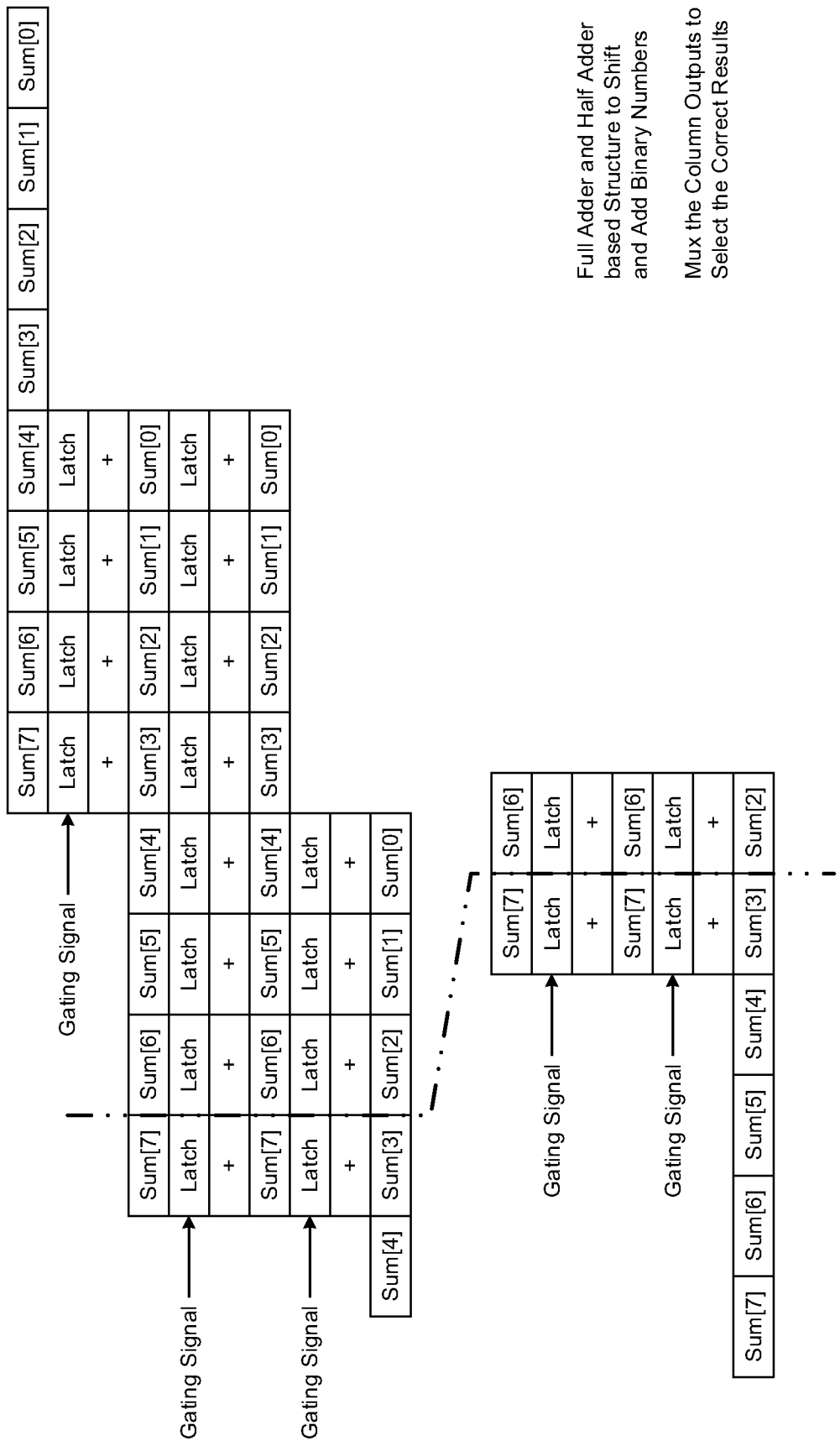

FIGS. 4A-4C illustrate structuring of multiplier circuitry 400 in accordance with implementations described herein. In particular, FIG. 4A shows multiplier circuitry 400A having building blocks, FIG. 4B shows multiplier circuitry 400B having adders (+), and FIG. 4C shows multiplier circuitry 400C having multiple adders (+) and latches. In some instances, the multiplier circuitry 400 may refer to an 8×8 multiplexer using 4×4 multiplier circuitry, and in other instances, the multiplier circuitry 400 may have a modular structure that provides for repeatability and that allows for programmable options to increase size of the multiplier circuitry 400. For instance, sixteen 4×4 multipliers (or four 8×8 multipliers) may be used to construct a 16×16 multiplier, and also, latching circuitry may be selectively removed depending on various usage profiles of a physical layout design.

In various implementations, the multiplier circuitry 400 may be implemented as a system or a device having various integrated circuit (IC) components that are arranged and coupled together as an assemblage or combination of parts that provide for a physical layout design and related structures. In some instances, a method of designing, providing or building the multiplier circuitry 400 as an integrated system or device may involve use of the various IC circuit components described herein so as to thereby implement various binary multiplication schemes and techniques associated therewith. Further, the multiplier circuitry 400 may also be integrated with computing circuitry and related components on a single chip, and the multiplier circuitry 400 may be implemented in embedded systems for various electronic, mobile and Internet-of-things (IoT) applications.

As shown in FIG. 4A, the multiplier circuitry 400A may be implemented as an 8×8 multiplier using four 4×4 multipliers. In this instance, the 8×8 multiplier may be created using four 4×4 multipliers as described herein. As such, the multiplier circuitry 400A may include multiple 4×4 multipliers that are arranged in a partial product tree, including, e.g., a first 4×4 multiplier 410, a second 4×4 multiplier 411, a third 4×4 multiplier 412, and a fourth 4×4 multiplier 413. In this instance, the partial product tree of an 8×8 multiplier may be sub-divided into four 4×4 multipliers 410, 411, 412, 413.

In some implementations, each of the 4×4 multipliers 410, 411, 412, 413 include 16 blocks or cells that are arranged in a 4 column by 4 row grid pattern, wherein each row is shifted (or offset) by one column from bottom to top. As such, each of the 4×4 multipliers 410, 411, 412, 413 may have a 1-2-3-4-3-2-1 block or cell per column arrangement when moving laterally across the structure from the left-side to the right-side. In some instances, the multiplier circuitry 400A may be referred to as a multi-adder based structure for shifting and adding binary numbers, wherein the multi-adder based structure may include one or more full-adders and/or one or more half-adders, as described herein above.

Also, as shown in FIG. 4A, the first 4×4 multiplier 410 may be configured to provide for a partial product of the second 4-bit part A[7:4] of the 8-bit multiplicand A[7:0] and the first 4-bit part B[3:0] of the 8-bit multiplier B[7:0], wherein the first 4×4 multiplier 410 provides A[7:4]*B[3:0]. In addition, the second 4×4 multiplier 411 may be configured to provide for a partial product of the first 4-bit part A[3:0] of the 8-bit multiplicand A[7:0] and the first 4-bit part B[3:0] of the 8-bit multiplier B[7:0], wherein the second 4×4 multiplier 411 provides A[3:0]*B[3:0].

Also, as shown in FIG. 4A, the third 4×4 multiplier 412 may be configured to provide for a partial product of the second 4-bit part A[7:4] of the 8-bit multiplicand A[7:0] and the second 4-bit part B[7:4] of the 8-bit multiplier B[7:0], wherein the third 4×4 multiplier 412 provides A[7:4]*B[7:4]. In addition, the fourth 4×4 multiplier 413 may be configured to provide for a partial product of the first 4-bit part A[3:0] of the 8-bit multiplicand A[7:0] and the second 4-bit part B[7:4] of the 8-bit multiplier B[7:0], wherein the fourth 4×4 multiplier 413 provides A[3:0]*B[7:4].

In some implementations, the multiplier circuitry 400B of FIG. 4B shows the manner in which a final sum of each partial product tree may be summed-up to achieve a final result. For instance, the summation results (i.e., Sum[0], Sum[1], . . . , Sum[7]) that are associated with FIG. 3 may be arranged in rows with a 4-bit offset (or shift) of the upper row and the lower row. In this instance, as shown in FIG. 4B, the blocks or cells of the multiplier circuitry 400B may be added (+) along each vertical column to thereby provide column added values for each partial product tree.

In some implementations, the multiplier circuitry 400C of FIG. 4C shows the introduction of latches (i.e., Latch) to the multiplier structure 400B of FIG. 4B. As shown in FIG. 4C, the summation results (i.e., Sum[0], Sum[1], . . . , Sum[7]) that are associated with FIG. 3 may be arranged in rows with a 4-bit offset (or shift) of the upper row and the lower row. In this instance, the blocks or cells of the multiplier circuitry 400C may be latched and added (+) along each vertical column to thereby provide column added values for each partial product tree. Thus, in FIG. 4C, the multiplier circuitry 400C introduces latches (i.e., Latch) between the summation results of each 4×4 multiplier so as to ensure that only the portions of logic that provide correct results actually toggle, and the remaining unused portions of logic do not toggle so as to save power. In some instances, the gating signal (or gated signal) may be used to turn one or more latches opaque or transparent based on the input signal. If the latch is opaque, then the output of the latch remains the same and does not change, and the logic below the latch does not toggle. In reference to programmability, the binary multiplication schemes and techniques as described herein may be repeated to build multipliers of any size, and latches may be introduced in a similar manner to save power. For instance, sixteen 4×4 multipliers (or four 8×8 multipliers) may be used to construct a single 16×16 multiplier, and also, latch blocks may be selectively removed depending on various usage profiles of a physical layout design.

In reference to FIG. 4C, the multiplier circuitry 400C may include an array of summation result cells (Sum[0], Sum[1], . . . , Sum[7]) that holds summation bit values for multiple shifted arrays added (+) together. The multiplier circuitry 400C may include latch circuitry (Latches) having gated elements disposed between the summation result cells (Sum[0], Sum[1], . . . , Sum[7]), and the gated elements are adapted to provide a portion of the summation bit values based on the gating signal. The multiple shifted arrays may be arranged in columns and column-shifted rows, and cells in each row may be shifted by at least one column with respect to cells in a previous row. The gated elements may refer to the latches, and the gating signal may be used to turn the output of the latches opaque or transparent. In some instances, the gated elements may include a first set of latches, and each latch of the first set of latches is configured as a transparent latch that receives the gating signal and toggles so as to provide a portion of the summation bit values as a toggling output based on the gating signal. In other instances, the gated elements may include a second set of latches, and each latch of the second set of latches is configured as an opaque latch that receives the gating signal and provides an output that remains unchanged so as to not provide a toggling output based on the gating signal. Further, the multiplier circuitry 400C may have a modular structure that provides for repeatability and that allows for programmable options to increase (or expand) the size of the multiplier circuitry 400C. For instance, sixteen 4×4 multipliers (or four 8×8 multipliers) may be used to construct a single 16×16 multiplier, and also, latch blocks may be selectively removed depending on various usage profiles of a physical layout design.

Figure 5:
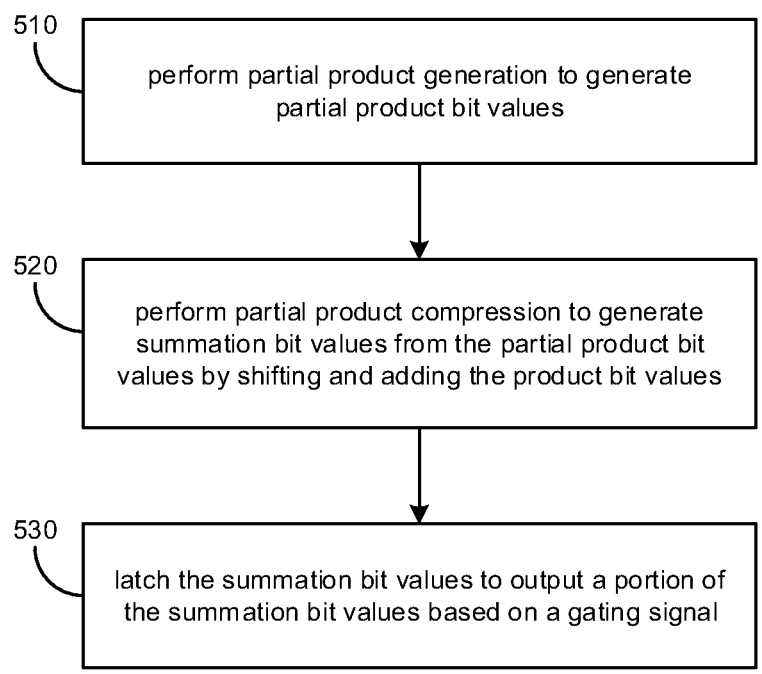
FIG. 5 illustrates a process flow diagram of a method for providing a binary multiplication technique 502 in accordance with implementations described herein.

FIG. 5 illustrates a process diagram of a method 500 for providing a binary multiplication technique 502 in accordance with implementations described herein.

It should be understood that even though method 500 may indicate a particular order of operation execution, in some cases, various portions of the operations may be executed in a different order, and on different systems. Additional operations and/or steps may be added to and/or omitted from method 500. Also, method 500 may be implemented in hardware and/or software. For instance, if implemented in hardware, method 500 may be implemented with various components and/or circuitry, as described herein above in reference to FIGS. 1-4C. In other instances, if implemented in software, method 500 may be implemented as various programs and/or software instruction processes that are configured for various binary multiplying schemes and techniques described herein. Also, if implemented in software, instructions related to implementing features and aspects of method 500 may be stored in memory and/or a database. In other instances, a computer or various other types of computing devices having at least one processor and memory may be configured to perform method 500.

In reference to FIG. 5, in block 510, method 500 may perform partial product generation to generate partial product bit values. In some implementations, performing the partial product generation may include using product logic to generate the product bit values. The product logic may operate as a partial product generator that is configured to receive multiplicand bits, receive multiplier bits, and provide the product bit values based on the multiplicand bits and the multiplier bits.

In block 520, method 500 may perform partial product compression to generate summation bit values from the partial product bit values by shifting and adding the product bit values. In some implementations, performing the partial product compression includes using summation logic coupled to the product logic to generate the summation bit values by shifting and/or adding the product bit values. The summation logic may operate as a partial product compressor that is configured to use full-adders and half-adders to perform shifting operations and adding operations associated with the product bit values.

In block 530, method 500 may latch the summation bit values to output a portion of the summation bit values based on a gating signal. In some implementations, latching the summation bit values includes using latching logic that is coupled to the summation logic to output the portion of the summation bit values based on the gating signal. Also, the latching logic may include one or more latches that operate as gated elements, and the gating signal may be used to turn an output of the latches opaque or transparent. The latches may include one or more sets of latches including, e.g., a first set of latches and a second set of latches. In some instances, the first set of latches may be configured to operate as transparent latches that receive the gating signal and toggle to provide the portion of the summation bit values as a toggling output based on the gating signal. Also, the second set of latches may be configured to operate as opaque latches that receive the gating signal and provide an output that remains unchanged so as to not provide a toggling output based on the gating signal.

It should be intended that the subject matter of the claims not be limited to the implementations and illustrations provided herein, but include modified forms of those implementations including portions of implementations and combinations of elements of different implementations in accordance with the claims. It should be appreciated that in the development of any such implementation, as in any engineering or design project, numerous implementation-specific decisions should be made to achieve developers' specific goals, such as compliance with system-related and business related constraints, which may vary from one implementation to another. Moreover, it should be appreciated that such a development effort may be complex and time consuming, but would nevertheless be a routine undertaking of design, fabrication, and manufacture for those of ordinary skill having benefit of this disclosure.

Described herein are various implementations of a device. The device may include multiplier circuitry having an array of summation result cells that holds summation bit values for multiple shifted arrays added together. The device may include latch circuitry having gated elements disposed between the summation result cells, and the gated elements may be adapted to provide a portion of the summation bit values based on a gating signal.

Described herein are various implementations of a multiplier. The multiplier may include product logic that generates product bit values. The multiplier may include summation logic coupled to the product logic that generates summation bit values by shifting and adding the product bit values. The multiplier may include latching logic coupled to the summation logic that is configured to output a portion of the summation bit values based on a gating signal.

Described herein are various implementations of a method. The method may include performing partial product generation to generate partial product bit values. The method may include performing partial product compression to generate summation bit values from the partial product bit values by shifting and adding the product bit values. The method may include latching the summation bit values to output a portion of the summation bit values based on a gating signal.

Reference has been made in detail to various implementations, examples of which are illustrated in the accompanying drawings and figures. In the following detailed description, numerous specific details are set forth to provide a thorough understanding of the disclosure provided herein. However, the disclosure provided herein may be practiced without these specific details. In some other instances, well-known methods, procedures, components, circuits and networks have not been described in detail so as not to unnecessarily obscure details of the embodiments.

It should also be understood that, although the terms first, second, etc. may be used herein to describe various elements, these elements should not be limited by these terms. These terms are only used to distinguish one element from another. For example, a first element could be termed a second element, and, similarly, a second element could be termed a first element. The first element and the second element are both elements, respectively, but they are not to be considered the same element.

The terminology used in the description of the disclosure provided herein is for the purpose of describing particular implementations and is not intended to limit the disclosure provided herein. As used in the description of the disclosure provided herein and appended claims, the singular forms "a," "an," and "the" are intended to include the plural forms as well, unless the context clearly indicates otherwise. The term "and/or" as used herein refers to and encompasses any and all possible combinations of one or more of the associated listed items. The terms "includes," "including," "comprises," and/or "comprising," when used in this specification, specify a presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. The terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing is directed to implementations of various techniques described herein, other and further implementations may be devised in accordance with the disclosure herein, which may be determined by the claims that follow.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A device, comprising:
multiplier circuitry configured to sum bit values for multiple shifted arrays together, wherein results of the summation are presented in an array of summation result cells; and
latch circuitry having gated elements disposed between the summation result cells, wherein each gated element determines whether its corresponding summation result cell outputs a summation bit value, and
wherein the gated elements are adapted to provide a portion of the summation bit values based on a gating signal.

2. The device of claim 1, wherein the multiple shifted arrays are arranged in columns and column-shifted rows, and wherein cells in each row are shifted by at least one column with respect to cells in a previous row.

3. The device of claim 1, wherein the gated elements comprise latches, and wherein the gating signal is used to turn the output of the latches opaque or transparent.

4. The device of claim 1, wherein the gated elements comprise a first set of latches, and wherein each latch of the first set of latches is configured as a transparent latch that receives the gating signal and toggles to provide the portion of the summation bit values as a toggling output based on the gating signal.

5. The device of claim 1, wherein the gated elements comprise a second set of latches, and wherein each latch of the second set of latches is configured as an opaque latch that receives the gating signal and provides an output that remains unchanged so as to not provide a toggling output based on the gating signal.

6. The device of claim 1, wherein the multiplier circuitry has a modular structure that provides for repeatability and that allows for programmable options to increase size of the multiplier circuitry.

7. A multiplier, comprising:
product logic that generates product bit values;
summation logic coupled to the product logic that generates summation bit values by shifting and adding the product bit values, wherein the summation bit values are stored in an array of summation result cells; and
latching logic coupled to the summation logic having gated elements corresponding to each summation result cell, wherein the latching logic is configured to output a portion of the summation bit values based on a gating signal.

8. The multiplier of claim 7, wherein the product logic is configured to operate as a partial product generator that receives multiplicand bits, receives multiplier bits, and provides the product bit values based on the multiplicand bits and the multiplier bits.

9. The multiplier of claim 7, wherein the product logic includes an array of product cells that holds the product bit values, and wherein the array of product cells is arranged in columns and rows, and wherein cells in each row are shifted by at least one column with respect to cells in a previous row.

10. The multiplier of claim 7, wherein the summation logic is configured to operate as a partial product compressor that uses full-adders and half-adders to perform shifting operations and adding operations associated with the product bit values.

11. The multiplier of claim 7, and wherein the array of summation cells is arranged in columns and rows, and wherein cells in each row are shifted by at least one column with respect to cells in a previous row.

12. The multiplier of claim 7, wherein the latching logic includes latches that operate as gated elements, and wherein the gating signal is used to turn an output of the latches opaque or transparent.

13. The multiplier of claim 12, wherein the latches comprise a first set of latches and a second set of latches.

14. The multiplier of claim 13, wherein the first set of latches is configured to operate as transparent latches that receive the gating signal and toggle to provide the portion of the summation bit values as a toggling output based on the gating signal.

15. The multiplier of claim 13, wherein the second set of latches is configured to operate as opaque latches that receive the gating signal and provide an output that remains unchanged so as to not provide a toggling output based on the gating signal.

16. A method, comprising:
performing partial product generation to generate partial product bit values;
performing partial product compression to generate summation bit values from the partial product bit values by shifting and adding the product bit values; and
latching the summation bit values to output a portion of the summation bit values based on a gating signal,
wherein latching the summation bit values includes using latches that operate as gated elements corresponding to each summation bit value.

17. The method of claim 16, wherein:
performing the partial product generation includes using product logic to generate the product bit values, and
performing the partial product compression includes using summation logic coupled to the product logic to generate the summation bit values by shifting and adding the product bit values.

18. The method of claim 17, wherein:
the product logic operates as a partial product generator that receives multiplicand bits, receives multiplier bits, and provides the product bit values based on the multiplicand bits and the multiplier bits, and
the summation logic operates as a partial product compressor that uses full-adders and half-adders to perform shifting operations and adding operations associated with the product bit values.

19. The method of claim 17, wherein:
latching the summation bit values includes using latching logic that is coupled to the summation logic to output the portion of the summation bit values based on the gating signal,
the gating signal is used to turn an output of the latches opaque or transparent.

20. The method of claim 19, wherein:
the latches comprise a first set of latches and a second set of latches,
the first set of latches is configured to operate as transparent latches that receive the gating signal and toggle to provide the portion of the summation bit values as a toggling output based on the gating signal, and
the second set of latches are configured to operate as opaque latches that receive the gating signal and provide an output that remains unchanged so as to not provide a toggling output based on the gating signal.

* * * * *